United States Patent
Lin

(10) Patent No.: US 8,408,809 B2
(45) Date of Patent: Apr. 2, 2013

(54) OPTICAL FIBER CONNECTOR AND MOLD INSERT FOR MAKING SAME

(75) Inventor: I-Thun Lin, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 467 days.

(21) Appl. No.: 12/765,774

(22) Filed: Apr. 22, 2010

(65) Prior Publication Data
US 2011/0150393 A1 Jun. 23, 2011

(30) Foreign Application Priority Data
Dec. 21, 2009 (TW) ................ 98143831 A

(51) Int. Cl.
*G02B 6/36* (2006.01)
*G02B 6/32* (2006.01)
(52) U.S. Cl. ............................. 385/53; 385/33
(58) Field of Classification Search .................. None
See application file for complete search history.

(56) References Cited

U.S. PATENT DOCUMENTS

| 4,290,667 A * | 9/1981 | Chown ........................ 385/33 |
| 6,942,398 B2 | 9/2005 | Morioka |
| 2011/0135256 A1* | 6/2011 | Louh ............................ 385/93 |

FOREIGN PATENT DOCUMENTS

CN 1162752 A 10/1997

* cited by examiner

*Primary Examiner* — Sarah Hahm
(74) *Attorney, Agent, or Firm* — Altis Law Group, Inc.

(57) ABSTRACT

An exemplary optical fiber connector includes a housing, and two lenses. The housing defines two blind holes each configured for receiving an optical fiber. The two lenses are formed on the housing and each of the lenses is aligned with a corresponding blind hole. Each of the blind holes includes a first cylindrical hole portion, a tapered hole portion and a second cylindrical hole portion facing a corresponding lens, and a diameter of the tapered hole portion gradually decreases from the first cylindrical hole portion towards the second cylindrical hole portion.

7 Claims, 2 Drawing Sheets

OPTICAL FIBER CONNECTOR AND MOLD INSERT FOR MAKING SAME

BACKGROUND

1. Technical Field

The present disclosure relates to optical fiber connectors and mold inserts for making the same.

2. Description of Related Art

Optical fiber connectors typically include a blind hole behind a lens. The blind hole includes a first cylindrical hole portion and a second cylindrical hole portion connected to the first cylindrical hole portion. The second cylindrical hole portion is nearer the lens than the first cylindrical hole portion. However, the second cylindrical hole portion is difficult to make well using an injection molding process because a mold insert for molding the second cylindrical hole portion is easily deformed under pressure from injection of the molten material.

Therefore, an optical fiber connector and a mold insert for making the same, which can overcome the above-mentioned problems, are needed.

DETAILED DESCRIPTION

Figure 1:
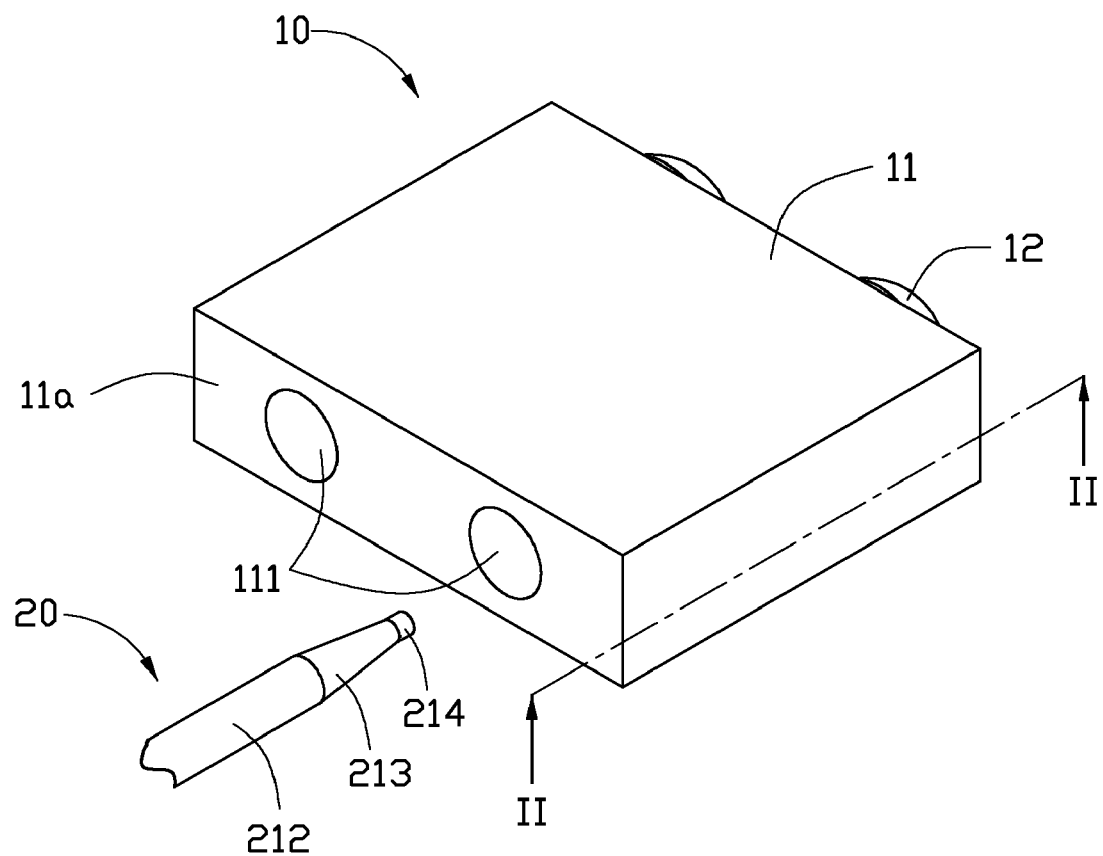
FIG. 1 is an isometric, schematic view of an optical fiber connector and a mold insert, according to an exemplary embodiment.
Figure 2:
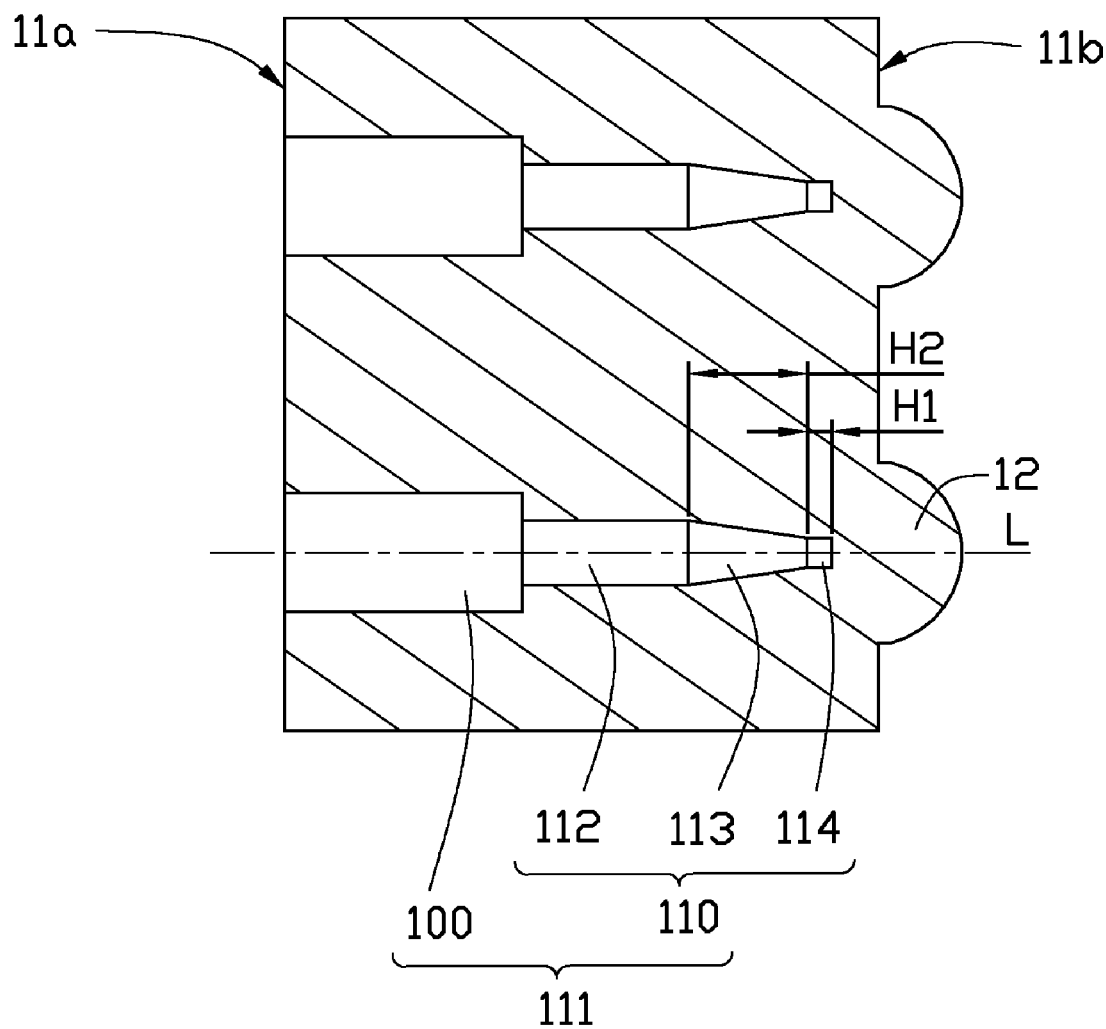
FIG. 2 is a sectional view taken along line II-II of the optical fiber connector of FIG. 1.

Referring to FIGS. 1 and 2, an optical fiber connector 10 includes a housing 11 and two lenses 12.

The housing 11 is substantially cuboid and includes a first surface 11a and a second surface 11b at opposite sides of the housing 11. The housing 11 defines two blind holes 111 parallel to each other. Each blind hole 111 includes a guide hole 100 and a receiving hole 110 connected to the guide hole 100 from the first surface 11a to the second surface 10b. The guide hole 100 is configured for guiding insertion of an optical fiber in the blind hole 111. A diameter of the guide hole 100 is greater than that of the receiving hole 110. The blind hole 111 is configured for receiving the optical fiber. It is to be understood that in alternative embodiments, the number of the blind hole 111 may be different and depends on a practical use of the optical fiber connector 10.

Each lens 12 is integrally formed with the housing 11 on the second surface 11b and aligned with a corresponding blind hole 111. The lens 12 is in front of the corresponding blind hole 111. A central axis L of the blind hole 111 coincides with an optical axis of the lens 12.

Each receiving hole 110 includes a first cylindrical hole portion 112, a tapered hole portion 113, and a second cylindrical hole portion 114. The first cylindrical hole portion 112, the tapered hole portion 113, and the second cylindrical hole portion 114 are connected from the first surface 11a to the second surface 11b. A diameter of the first cylindrical hole portion 112 is greater than that of the second cylindrical hole portion 114. A diameter of the tapered hole portion 113 gradually decreases from the first cylindrical hole portion 112 to the second cylindrical hole portion 114. The tapered hole portion 113 smoothly connects the first cylindrical hole portion 112 to the second cylindrical hole portion 114, that is, a diameter of an end of the tapered hole portion 113 connected to the first cylindrical hole portion 112 is the same as that of the first cylindrical hole portion 112 and a diameter of another end of the tapered hole portion 113 connected to the second cylindrical hole portion 114 is the same as that of the second cylindrical hole portion 114. In this way, when inserting the optical fiber (not shown) into the receiving hole 110, the optical fiber can be guided smoothly and damage of the optical fiber can be avoided.

The blind hole 111 satisfies the formula: $0.11 \leq H1/H2 < 1$, where H1 represents a length of the second cylindrical hole portion 114, and H2 represents a length of the tapered hole portion 113. That is, the length of the tapered hole portion 113 is greater than that of the second cylindrical hole portion 114. The length H2 of the tapered hole portion 113 is measured along the central axis L of the blind hole 111. The length H1 of the second cylindrical hole portion 114 is measured along the central axis L of the blind hole 111, and $0.05$ (millimeters) $< H1 \leq 0.2$ (millimeters). In this embodiment, H1/H2 is about 0.11. In an injection molding process for molding the optical fiber connector, a mold insert 20 is used in this embodiment, as shown in FIG. 1. The mold insert 20 includes a first cylinder 212, a tapering body 213, and a second cylinder 214. The first cylinder 212, the tapering body 213, and the second cylinder 214 are used for molding the first cylindrical hole portion 112, the tapered hole portion 113 and the second cylindrical hole portion 114 respectively. Correspondingly, in this embodiment, a ratio of a length of the second cylinder 214 to a length of the tapering body 213 is about 0.11, and the second cylinder 214 may be least deformed in the injection molding process.

During manufacturing, the mold insert 20 is inserted into a mold cavity, and then a molten material is injected into the mold cavity. The molten material surrounds the mold insert 20. A resultant product with the blind holes 111 is formed corresponding to the mold insert 20.

The gradual tapering of the body 213 connecting the first cylinder 212 to the second cylinder 214, prevents deformation of the blind hole 111 under the pressure of the injection process, and the blind hole 111 of the optical fiber connector 10 can be easily and well made.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical fiber connector, comprising:
   a housing defining a blind hole; and
   a lens formed on the housing and aligned with the blind hole, wherein the blind hole comprises a receiving hole configured for receiving an optical fiber, the receiving hole comprises a first cylindrical hole portion, a tapered hole portion and a second cylindrical hole portion facing the lens, a length of the tapered hole portion is greater than that of the second cylindrical hole portion, and a diameter of the tapered hole portion gradually decreases from the first cylindrical hole portion towards the second cylindrical hole portion; and wherein the blind hole further comprises a guide hole connected to the first cylindrical hole portion away from the lens, the blind hole only opens at the guide hole, the guide hole is configured for guiding insertion of the optical fiber in the blind hole.

2. The optical fiber connector of claim 1, wherein the lens is integrally formed with the housing.

3. The optical fiber connector of claim 1, wherein the housing comprises a first surface and a second surface at opposite sides of the housing, and the lens is formed on the second surface.

4. The optical fiber connector of claim 3, wherein the blind hole extends from the first surface towards the second surface.

5. The optical fiber connector of claim 1, wherein the blind hole satisfies the formula: $0.11 \leqq H1/H2 < 1$, where H1 represents the length of the second cylindrical hole portion, and H2 represents the length of the tapered hole portion.

6. The optical fiber connector of claim 1, wherein a diameter of the guide hole is greater than that of the first cylindrical hole portion.

7. The optical fiber connector of claim 1, wherein the length H1 of the second cylindrical hole portion satisfies the following formula: $0.05 \text{ (millimeters)} < H1 \leqq 0.2 \text{ (millimeters)}$.

* * * * *